United States Patent
Gurule

(10) Patent No.: US 9,283,666 B2
(45) Date of Patent: Mar. 15, 2016

(54) GAS REGULATOR OVER-PRESSURE SERVICE TOOL

(71) Applicant: Michael W. Gurule, Albuquerque, NM (US)

(72) Inventor: Michael W. Gurule, Albuquerque, NM (US)

( * ) Notice: Subject to any disclaimer, the term of this patent is extended or adjusted under 35 U.S.C. 154(b) by 133 days.

(21) Appl. No.: 14/193,342

(22) Filed: Feb. 28, 2014

(65) Prior Publication Data

US 2014/0238503 A1 Aug. 28, 2014

Related U.S. Application Data

(60) Provisional application No. 61/771,042, filed on Feb. 28, 2013.

(51) Int. Cl.
| | |
|---|---|
| *B25B 27/24* | (2006.01) |
| *B25F 1/00* | (2006.01) |
| *F16K 17/00* | (2006.01) |
| *F16K 51/00* | (2006.01) |

(52) U.S. Cl.
CPC . *B25F 1/00* (2013.01); *F16K 17/00* (2013.01); *F16K 51/00* (2013.01); *Y10T 137/0486* (2015.04)

(58) Field of Classification Search
CPC ......... F16K 17/00; B25B 27/24; B25B 27/30; B25F 1/00; Y10T 137/7728
USPC ........ 137/315.27, 315.41, 327, 456, 458, 461
See application file for complete search history.

(56) References Cited

U.S. PATENT DOCUMENTS

| | | | | |
|---|---|---|---|---|
| 3,420,257 | A * | 1/1969 | Lansky | G05D 16/0663 |
| | | | | 137/116.5 |
| 4,033,374 | A * | 7/1977 | Danon | F16K 17/32 |
| | | | | 137/461 |
| 4,817,664 | A * | 4/1989 | Chang | G05D 16/0683 |
| | | | | 137/456 |
| 5,209,253 | A * | 5/1993 | Taylor | F16K 17/164 |
| | | | | 137/461 |
| 6,644,339 | B2 * | 11/2003 | Gorges | E03C 1/28 |
| | | | | 137/315.41 |
| 2012/0261005 | A1* | 10/2012 | Cojocaru | F16K 17/32 |
| | | | | 137/461 |

* cited by examiner

*Primary Examiner* — John K Fristoe, Jr.
*Assistant Examiner* — Reinaldo Sanchez-Medina

(57) ABSTRACT

A tool for resetting a gas regulator valve after an over-pressure event.

11 Claims, 3 Drawing Sheets

GAS REGULATOR OVER-PRESSURE SERVICE TOOL

RELATED APPLICATION

This application claims the benefit of U.S. Provisional Application No. 61/771,042 filed on Feb. 28, 2013. The provisional patent application identified above is incorporated herein by reference in its entirety to provide continuity of disclosure.

FIELD OF THE INVENTION

The present invention relates to the field of gas valves (regulators) and in particular, to a tool used in connection with a gas regulator having an overpressure safety mechanism.

BACKGROUND OF THE INVENTION

In many installations of commercial and industrial gas regulators, there is a need for automatic overpressure shut-off devices or mechanisms to protect against dangerous gas line overpressure particularly for public buildings, schools, theaters, hospitals, and similar public venues. American Meter Company is a larger supplier of gas regulators for industrial, commercial and residential applications. For example, the company makes industrial regulators such as High-Pressure Models Nos. 1800 and 2000 having an overpressure shut-off mechanism. In the event of a gas line overpressure, tripping or activating the overpressure mechanism shuts off gas flow. Thereafter, it is necessary for a maintenance person to reset the overpressure mechanism once the gas line has been restored to normal gas pressure. Additionally, when a new regulator is installed, it is common practice to test for the proper safety shut down assuring that the overpressure mechanism is in operative condition. A regulator that includes both under pressure and overpressure shut off mechanisms is shown on the website of the Elster-American Meter Company, particularly, page 5, www.elster-americanmeter.com/downloads/SB8450.pdf (last accessed Jan. 9, 2014).

The present invention is concerned solely with the overpressure shut off mechanism of the regulator. The American Meter web page literature includes two schematic diagrams showing the components of the overpressure mechanism in detail, and in the normal and tripped positions that have been reproduced as FIGS. 1 and 2 for this application. A brief explanation of the operation of the overpressure mechanism will provide background for the various functions performed by the tool of the present invention, an embodiment of which will be described below.

BRIEF DESCRIPTION OF THE DRAWINGS

The present invention in one embodiment, is described in connection with the accompanying drawings in which.

DETAILED DESCRIPTION OF ONE EMBODIMENT

Figure 1:
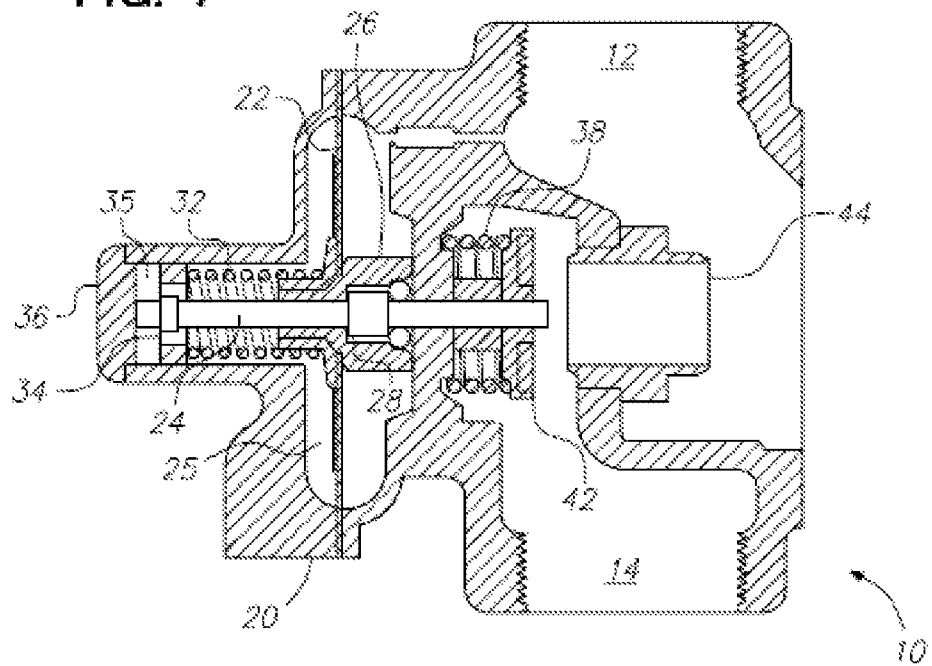
FIG. 1 is a reproduction of a diagrammatic representation of the overpressure shut-off mechanism in the Elster-American Meter Company Models 1800 and 2000 Series industrial regulators, shown in the normal or cocked position.

With reference to the schematic diagram in FIG. 1, the body of the overpressure mechanism 10 may be mounted in a horizontal position and in fluid communication with the gas inlet 12 and outlet 14. In FIG. 1 the overpressure mechanism is shown in the normal or operative position, that is, when gas at correct pressure is flowing through the regulator. It will be seen that the overpressure mechanism indicated generally at 10 includes a body 20 and diaphragm 22 that is vertically mounted within a first chamber 25 of overpressure mechanism body 20. Passing through diaphragm 22 is an elongated cylindrical diaphragm rod or stem 24 and diaphragm holder 26. The stem, as seen best in FIG. 5, has a first enlarged portion 29 and a second enlarged portion 28 centrally, longitudinally positioned. Portion 28 is normally seated within a cylindrical internal opening 30 in holder 26 (See, FIG. 1); the stem diaphragm holder 26 is attached to the center portion of diaphragm 22.

Figure 2:
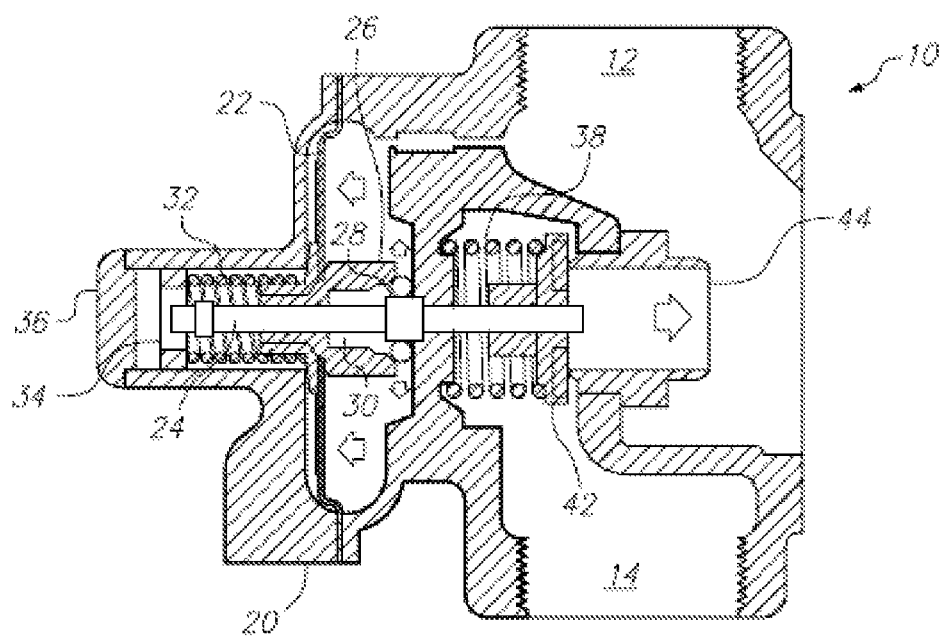
FIG. 2 is a diagrammatic view as in FIG. 1 shown in an over-pressure tripped position.

To the left of the diaphragm (as illustrated in FIGS. 1 and 2) is a second chamber 25 housing a first spring 32 that biases the diaphragm 22 to the right (as seen in FIGS. 1 and 2); the spring 32 force is approximately equal to the gas line pressure and thus the diaphragm 22 is maintained in the balanced vertical operative position within first chamber 25 as shown in FIG. 1. The first spring 32 is held in compressed position by a cylindrical threaded ring 34 which when fully threaded into the overpressure body 20 (fully to the right as shown in FIG. 2) maintains the spring in compressed condition, with the proper amount of spring force applied. The spring is loosely housed in the cylindrical second chamber 35 of the overpressure mechanism body 20. At the left end of second chamber 35, there is a cap 36 that is removable to provide access to the ring 34, spring 32, and diaphragm stem 24.

In the gas flow outlet 14, centered over the stem 24 is a second spring 38 normally in the compressed condition as shown in FIG. 1. At the right end of stem 24 is mounted a stopper 42 with resilient member 43 (See FIG. 5) adjacent to the valve passage 44 that is the main passage for interconnecting gas flow between the inlet 12 and outlet 14. In an overpressure condition, the stopper 42 will close the passage 44 and thus stop the flow of the high pressure gas into the user facility.

In FIG. 2, there is shown the overpressure shut off mechanism in the tripped position. This occurs when the gas pressure exceeds the spring 38 force on the diaphragm 22 thus forcing the diaphragm to the left as shown in FIG. 2. This causes the diaphragm holder 26 to move to the left releasing the second enlarged portion 28 of the diaphragm stem 24 from the holder 26 internal opening allowing the stem 24 to move to the right so that spring 38 forces the stopper 42 to the right so as to close the regulator passage 44 from the high pressure (utility company) side, to the low pressure (customer) side, thus completely shutting off the flow of gas and thereby providing safety against a hazardous gas condition.

Figure 3:
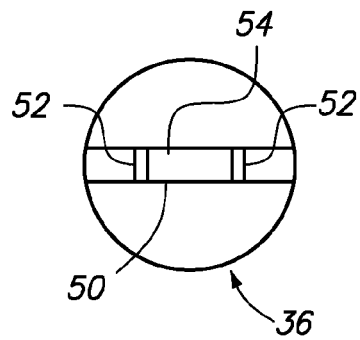
FIG. 3 is an end view of a cap on the overpressure mechanism of the gas regulators identified above.
Figure 3A:
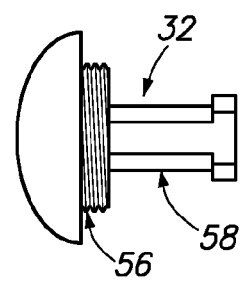
FIG. 3A is a side view of the cap.

The present invention in the embodiment shown discloses a service tool that may be used to reset the stopper 42, diaphragm 22, holder 26, and diaphragm stem 24 once the gas pressure has been returned to normal pressure. To do so, it is necessary to remove the cap 36 at the end of the second chamber 35 of the overpressure mechanism body 20. As seen in FIG. 3, a slot 50 bifurcates the circular cap 32. Two transverse identical members 52 are disposed transversely to the slot 50 at positions inwardly from the edge of the cap 32 thereby defining a rectangular slot 54. A reduced diameter threaded portion 56 of the cap 32 is threaded into the gas valve cylindrical body 20 and must be securely fastened. An extended, smaller diameter, half cylinder 58 projects further along the longitudinal axis of the cap 32 and includes an enlarged half cylinder.

Figure 4:
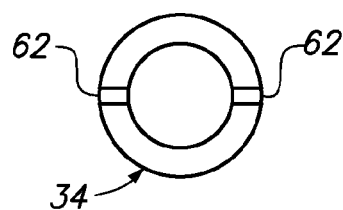
FIG. 4 is a front view of a threaded ring.
Figure 4A:
FIG. 4A is a side view of the threaded ring.
Figure 5:
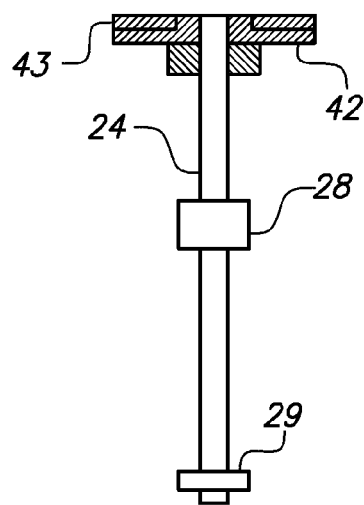
FIG. 5 is a view of a stem, including a stopper.

From FIGS. 1 and 2 of the overpressure mechanism of the gas regulator, it will be seen that when the cap 36 is removed, the threaded ring 34 that compresses the spring 38, as seen best in FIG. 4, has two radially disposed rectangular slots 62 at diametrically opposed portions of the ring to permit a mating tool to rotate the ring 30 and thereby compress, or decompress, the spring 38. When the ring 34 is fully threaded into the body 20 the spring 38 is under maximum force and is fully compressed. The second enlarged portion 28 of diaphragm stem 24 as shown in FIG. 5, will be understood from the diagrammatic views in FIGS. 1 and 2 of the overpressure mechanism to be captured by the holder 26 attached to diaphragm 22. At the outer or left-hand end of stem 24 as seen in FIG. 1, the first enlarged portion 29 of larger diameter than the diameter of the stem 24 is integral with, or is fixedly mounted in place on, stem 24.

When the overpressure mechanism is tripped, the diaphragm 22 moves to the left releasing the second enlarged portion 28 from the holder opening 30 allowing stem 24 to move to the right under the pressure of spring 38 to effect the shut off as seen in FIG. 2. Once tripped, it is necessary to reset the overpressure mechanism, that is, move the diaphragm stem 24 back to its normal or original position (to the left in FIGS. 1 and 2). To move the stem 24 to the left or normal position, within holder opening 30, considerable force must be applied to overcome the force of spring 38.

After an overpressure event occurs the components of the overpressure mechanism are as shown in FIG. 2.

In a reset operation, three functions must be performed. First, the cap 36 must be removed. Second, the spring 38 pressure must be relieved by unscrewing ring 30 so as to decompress the spring. Third, the stopper 42 is biased to the right by spring 38 as shown in FIG. 2 and must be moved back to the normal position. This latter step is usually done with long-nose pliers, but the force required and the application of the force to the diaphragm stem often causes the pliers to slip off the diaphragm stem as it is attempted to be withdrawn to the normal position.

With reference again to the multi-function tool of the invention, it will be seen that the tool is constructed of steel, though various materials may be used and is pocket-sized. The tool comprises a cylindrical body 100 having a transverse opening through which a cylindrical bar 102 is passed and secured in place by a set screw 104. The tool is rotated by grasping the bar 102 on the left and right hand arms 106, 108, as seen best in FIG. 6. At the upper end of the body 100, as seen in FIG. 6B, there is provided means for removing the cap 36 from the second chamber, such as a rectangular projection 110 that with reference to FIG. 3, will be seen to be of the same size in length and breadth to snugly fit in the slot 54 of cap 36. Because the cap 36 must be tightly closed, considerable twisting or rotational force must be applied to unscrew the cap from its normal closed position. While a screwdriver may be used, the force required and the generally available screwdriver tips causes the tip to easily slip out of the slot 54 making it difficult to remove cap 36. Thus, the multi-function tool may be used to perform the function of removing the cap from the overpressure mechanism body 20 without slipping out of slot 54 as is common with a screwdriver that is not of the same width and thickness as the slot 54 in the cap. The removal of the cap 36 is the first step in the reset operation.

Figure 6A:
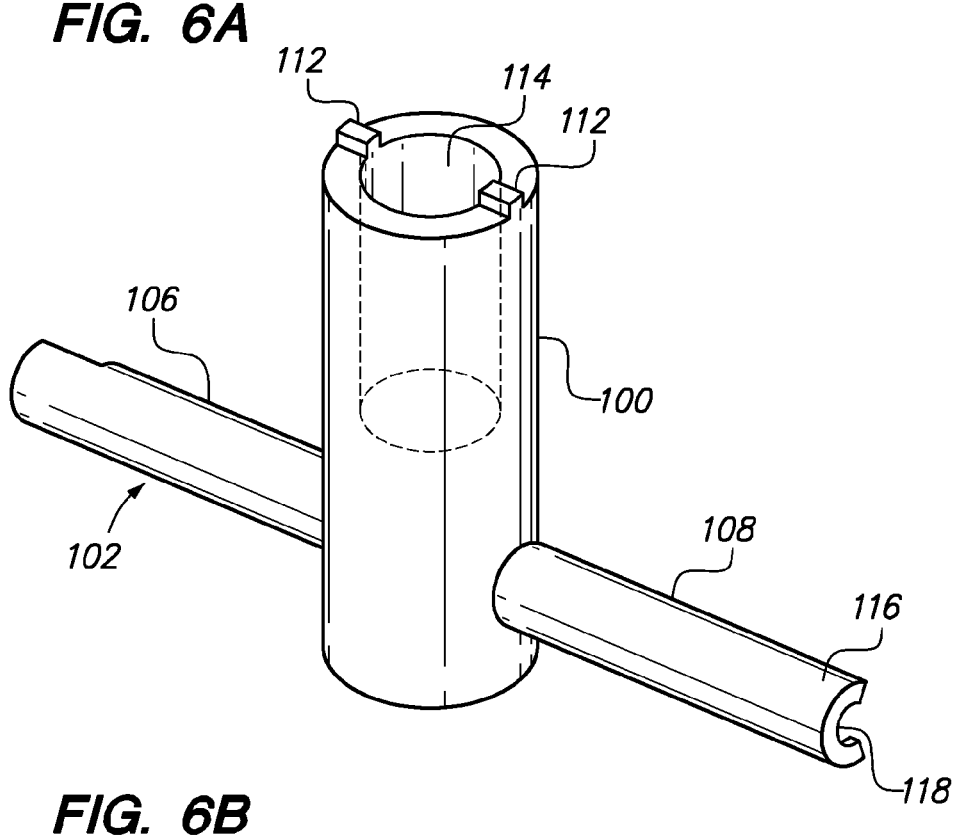
FIG. 6A is a bottom perspective view of one embodiment of a tool in accordance with the present invention.
Figure 6B:
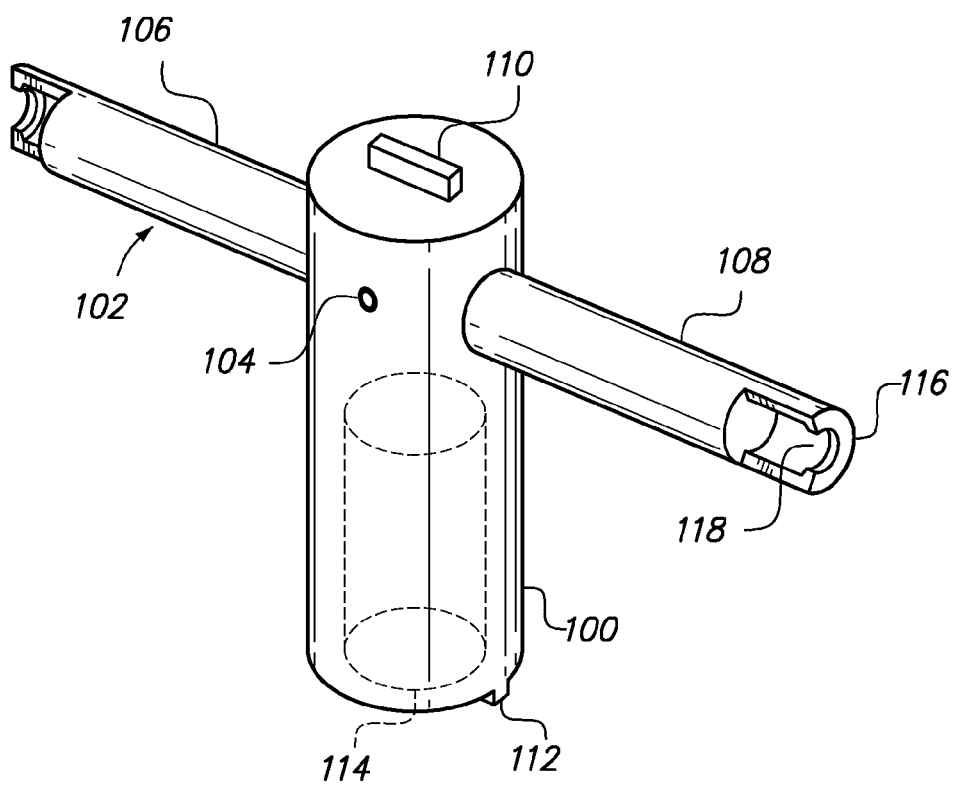
FIG. 6B is a top perspective view of the tool shown in FIG. 6A.

With reference to FIG. 6A, it will be seen that the bottom of the body 100 has a cylindrical opening 114 such that it may be positioned around the diaphragm stem 24 when body 100 is inserted into the second chamber 35 of valve body 20 after removal of ring 34. The opening defines an annular area provided with diametrically opposed rectangular members 112 that project from the end of the tool body 100. The rectangular projections 112 comprise means for releasing compression of spring 38 after an over-pressure tripping, a second step in the reset method and compressing the spring after reset of the diaphragm, a third step in the method. The projections 112 are sized, as seen best in FIG. 4, so they will fit into the slots 62 of ring 34 and by rotating the tool 100 the ring may be unscrewed so as to relieve the force on spring 38 at which point the spring may be removed providing easier access to the diaphragm stem 24 which, as indicated above, is forcibly held in the closed position and must be reset in order to return the diaphragm 22 to its normal position.

With reference now to bar 102, it includes means insertable into the second chamber 35 for grasping the first enlarged portion 29 of stem 24 and permitting stem 24 to be withdrawn toward the open end of the second chamber overcoming the bias of second spring 38 and resetting stem 24 and diaphragm 22 to the normal operating position. It will be seen that the means may include at each end a partial cylindrical opening that will fit over the end piece 29 of diaphragm stem 24 shown in FIG. 5. As seen best in FIG. 6B, one arm 108 of the bar 102 has a partial cylindrical, or arcuate portion of the arm cut away such that there is a C-shaped portion 116 defining an opening 118 of lesser diameter than the diameter of the diaphragm stem end piece 29. As indicated above, while the diaphragm is difficult to return to the normal position, the end of the arm 108, as shown in FIG. 6, can be inserted into the second chamber 35 in cylindrical body 20 of the overpressure mechanism such that the arm may be moved past the stem end piece 29 by slightly tilting the arm 108 and then returning it to the central or straight position so that arcuate portion 116 of arm 108 will catch the end piece 29 of the diaphragm stem 24 permitting the tool to forcibly withdraw the diaphragm stem 24 overcoming the force of spring 38 and thus opening gas passage 44. This operation eliminates the need for long-nose pliers and the problems of securely grasping the stem and overcoming the force that is necessary to reset the diaphragm, holder and stem into normal operating position.

With reference to FIG. 6B, it will be seen that the opposite end of the bar 102, at the termination of arm 106, has a similar configuration to that just described but the arcuate portion is smaller, circumferentially, thus making it easier to fit over the end piece of the diaphragm stem, or to accommodate diaphragm stem end pieces of different diameter. This end of the bar may be used alternatively to the end of bar arm 108.

From the above description, it will be seen that the embodiment of the present invention provides a multi-function tool for use in resetting the overpressure mechanism of gas regulator valves. This single tool facilitates removal of the cap, unscrewing of the ring and thus decompressing the spring, grasping the end piece of the diaphragm stem so as to reset the diaphragm to its normal operating position, screwing the ring so as to compress the spring and engagement of the cap so as to reseal the chambers.

In the drawings and specification, there has been disclosed one embodiment of the present invention and although specific terms are employed, they are used in a generic and descriptive sense only and not for purposes of limitation, the scope of the invention being set forth in the following claims.

The means descriptions are provided so as to clearly link the structure of the means and the corresponding means-plus-function limitations in the claims and is intended to take advantage of the Congressional mandate in 35 U.S.C. §112, Paragraph 6, unfettered by Federal Circuit Court of Appeals interpretation/emasculation.

The invention claimed is:

1. A tool for use in connection with servicing gas valves wherein the gas valve includes an overpressure shut-off assembly that includes:
   a body having an inlet for gas, an outlet for gas, and a first passage interconnecting the inlet and outlet, the body including a chamber having a second passage to the gas inlet;
   a diaphragm positioned in the chamber in a first or normal operating position or in a second or overpressure position, a holder attached to the diaphragm and having a cylindrical internal opening;
   the chamber having a sub-chamber having internal threads, an axis substantially perpendicular to the diaphragm and having an external cap with a slot in threaded engagement with the internal threads of the sub-chamber so as to close the sub-chamber during the normal operating condition;
   a first spring located in the sub-chamber and biasing the diaphragm and holder to the first or normal operating position;
   a valve stem positioned within the first spring in the sub-chamber, the stem comprising an elongated cylindrical body including a first enlarged portion at a proximal end adjacent said sub-chamber cap and a second enlarged portion received and held in the holder internal opening when the diaphragm is in the first or normal operating position;
   a ring having external threads and diametrically opposed slots for receiving a tool, the ring axially positioned so as to maintain a bias on the first spring to maintain the diaphragm in the first or normal position;
   a distal end of the stem passing through an opening in the chamber into the gas outlet and having a cylindrical member attached at the distal end including a stopper that is positioned adjacent the first passage interconnecting the gas inlet and outlet to allow the flow of gas from the inlet to the outlet in normal operating condition;
   a second spring positioned within the gas outlet around the distal end of the stem adjacent the stopper and biasing the stem and stopper toward closing the interconnecting gas first passage, the stem and stopper being prevented from movement until overpressure gas biases the diaphragm to an over-pressure condition that releases the second enlarged portion of the stem permitting the stem to move toward the outlet and thereby release the second spring to permit the stopper to close the outlet passage;
   said tool comprising:
   a cylindrical body having a transversely extending bar attached at a first end of the body, the first end of said body having a projection for mating with the slot in the cap, the second end of said body having an axial cylindrical opening defining an annular area and two opposed projections on the annular area for mating with the slots in the ring; and
   said bar having an arcuate projection on at least one end, said arcuate projection including a reduced diameter second arcuate projection for positioning over the first spring and stem after removal of the cap after the diaphragm is tripped by said over-pressure condition and capturing the first enlarged portion of the stem permitting the tool to forcibly move the stem back to the normal operating position thereby resetting the valve over-pressure shut-off assembly in preparation for further service.

2. The gas valve servicing tool of claim 1 wherein said transversely extending bar extends on each side of said body.

3. The gas valve servicing tool of claim 2 wherein each end of said bar includes a valve stem engaging and extracting section.

4. The gas valve servicing tool of claim 1 wherein said body axial cylindrical opening is larger than the diameter of the first spring of the valve.

5. The gas valve servicing tool of claim 1 wherein the depth of said axial cylindrical opening is greater than the uncompressed length of the first spring.

6. The gas valve servicing tool of claim 1 wherein said tool is made of steel.

7. The gas valve servicing tool of claim 1 wherein said tool is pocket-sized.

8. The gas valve servicing tool of claim 1 wherein said tool is pocket-sized.

9. A tool for use in resetting a gas valve over-pressure mechanism, comprising:
   a cylindrical body;
   a substantially rectangular projection at a first end of said body;
   a cylindrical opening in a second end of the body defining an annular area and a pair of projections on the annular area at diametrically opposite positions;
   a bar attached to the first end of the body having two arms, one on each side of the body; and
   at least one arm having an arcuate extension at the distal one end.

10. The gas valve servicing tool of claim 9 wherein each end of said bar includes a valve stem engaging and extracting section.

11. A method for resetting a gas valve having an overpressure shut-off assembly after an over-pressure condition has resulted in closure of a passage interconnecting an inlet and an outlet, the valve comprising:
   a body including the inlet for gas, the outlet for gas, and the passage interconnecting the inlet and outlet, the body including a chamber having a passage to the gas inlet;
   a diaphragm positioned in the chamber in a first or normal operating position or in a second or overpressure position, a holder attached to the diaphragm and having a cylindrical internal opening;
   the chamber having a sub-chamber having internal threads, an axis substantially perpendicular to the diaphragm and having an external cap with a slot in threaded engagement with the internal threads of the sub-chamber so as to close the sub-chamber during the normal operating condition;
   a first spring located in the sub-chamber and biasing the diaphragm and holder to the first or normal operating position;
   a valve stem having proximal and distal ends positioned within the first spring in the sub-chamber, the stem comprising an elongated cylindrical body including a first enlarged portion at the proximal end adjacent the sub-chamber cap and a second enlarged portion received and held in the holder internal opening when the diaphragm is in the first or normal operating position;
   a ring having external threads and diametrically opposed slots for receiving a tool, the ring axially positioned so as to maintain a bias on the first spring to maintain the diaphragm in the first or normal position;

the distal end of the stem passing through an opening in the chamber into the gas outlet and having a cylindrical member attached at the distal end including a stopper that is positioned adjacent the passage interconnecting the gas inlet and outlet to allow the flow of gas from the inlet to the outlet in normal operating condition;

a second spring positioned within the gas outlet around the distal end of the stem adjacent the stopper and biasing the stem and stopper toward closing the interconnecting gas passage, the stem and stopper being prevented from movement until overpressure gas biases the diaphragm to an over-pressure condition that releases the second enlarged portion of the stem permitting the stem to move toward the outlet and thereby release the second spring to permit the stopper to close the outlet passage;

the steps of the method comprising:

removing the cap and ring;

placing a cylindrical tool having a cylindrical opening at one end within the sub-chamber around the first spring and temporarily grasping the first enlarged portion of the stem with an arm on the tool;

forcibly withdrawing the tool so as to overcome a force of the second spring to reset the position of the stem, first and second springs and the stopper;

returning the ring into the sub-chamber and threading the ring so as to compress the first spring; and returning the cap onto the valve body over-pressure mechanism.

\* \* \* \* \*